J. A. PELIZZONI.
INDEXING FIXTURE FOR MACHINE TOOLS.
APPLICATION FILED NOV. 4, 1920.
1,399,992.  Patented Dec. 13, 1921.
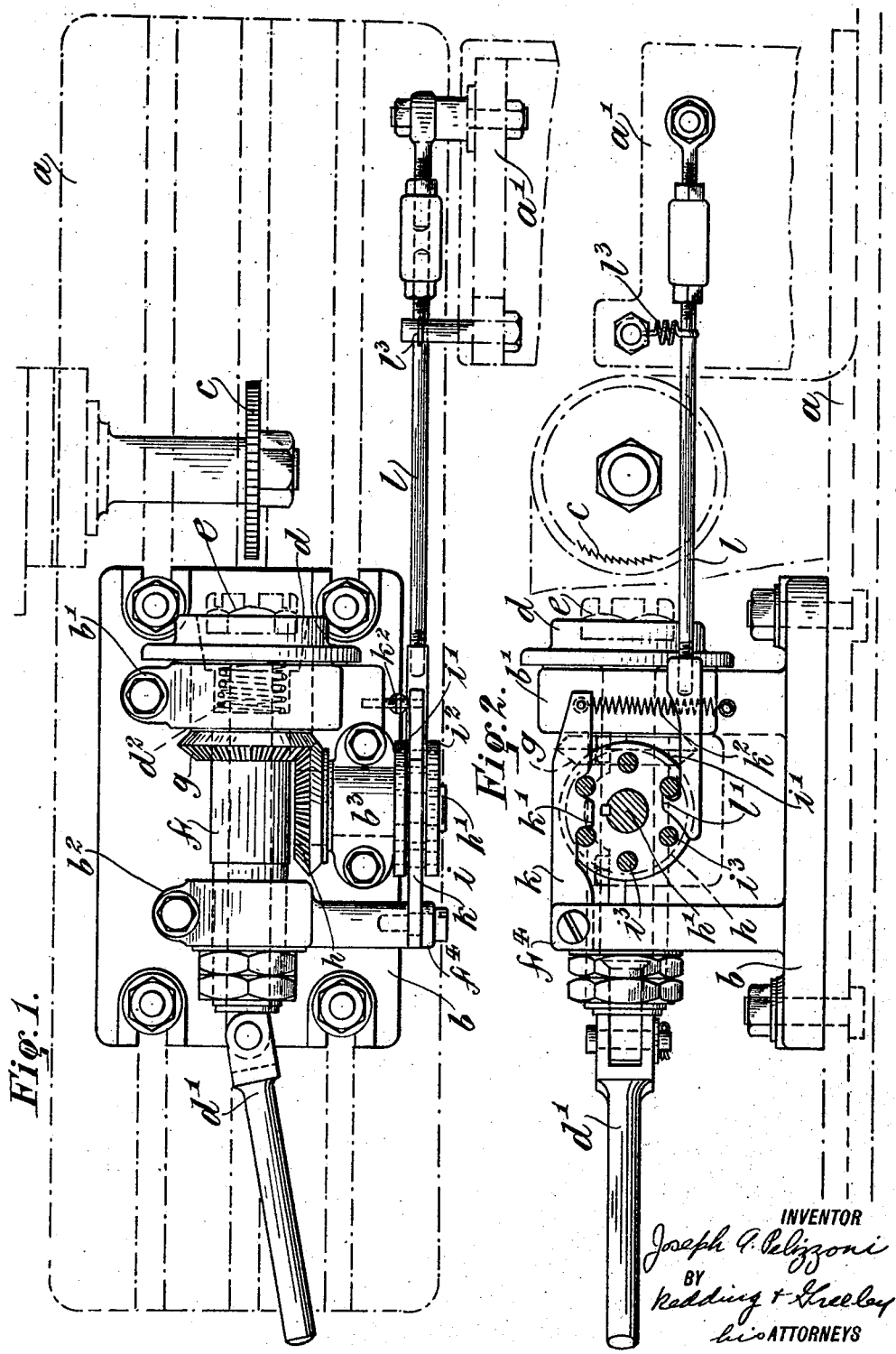
INVENTOR
Joseph A. Pelizzoni
BY
Redding & Greeley
his ATTORNEYS

UNITED STATES PATENT OFFICE.

JOSEPH A. PELIZZONI, OF ALLENTOWN, PENNSYLVANIA, ASSIGNOR TO INTERNATIONAL MOTOR COMPANY, OF NEW YORK, N. Y., A CORPORATION OF DELAWARE.

INDEXING-FIXTURE FOR MACHINE-TOOLS.

1,399,992.   Specification of Letters Patent.   Patented Dec. 13, 1921.

Application filed November 4, 1920. Serial No. 421,770.

*To all whom it may concern:*

Be it known that I, JOSEPH A. PELIZZONI, a citizen of the United States, residing in Allentown, in the State of Pennsylvania, have invented certain new and useful Improvements in Indexing-Fixtures for Machine-Tools, of which the following is a specification, reference being had to the accompanying drawing, forming a part hereof.

The present invention relates to a fixture associated with a machine tool for holding an object to be operated upon in predetermined indexed positions, the indexing being done automatically. More particularly, the invention is concerned with a nut castellating fixture in which for the purposes of this description it will be assumed that a hexagonal nut is to be cut with six slots, the nut being presented to the cutter properly indexed for each succeeding cut. The invention has for its general object to provide an indexing fixture associated with a machine tool having a reciprocating table, which shall be simple in construction, invariable in operation and will permit the object to be operated upon to be clamped in place and released with the greatest facility. The invention has for its further object to provide an indexing fixture which will permit the number of cuts on the object to be readily varied or their angular displacement about the axis of rotation to be changed by the replacement of a simple indexing member. The invention will be described with great particularity with respect to the accompanying drawing in which the improvements are illustrated as embodied in a machine for castellating hexagonal nuts. In the drawings, Figure 1 is a view in plan of the fixture showing its relation to the fixed cutter and the bed of the machine tool.

Fig. 2 is a view in side elevation of the parts shown in Fig. 1.

The machine bed $a$ which may be of any character has mounted reciprocably thereon a table $b$, the reversals in travel of which are controlled, both as to distance and time, automatically, in a manner which is commonly employed and forms no part of the present invention. A suitable cutter for performing all of the successive cuts is illustrated at $c$. The improved fixture includes a draw chuck $d$, the compressible jaws of which are actuated by a cam lever $d'$, the release of the chuck being effected by a spring $d^2$ for the purpose of permitting the removal of the work which, in the illustrated embodiment, is shown as a hexagonal nut $e$. The chuck itself is of common type. It includes a sleeve $f$ which is journaled rotatably in bearings $b'$, $b^2$, carried on the table $b$. To the sleeve $f$ is affixed a bevel gear $g$ which meshes, preferably with a one to one ratio, with a bevel gear $h$ which is supported on a stub shaft $h'$ journaled in a bearing $b^3$ on the table $b$. To the stub shaft $h'$ is keyed removably an indexing wheel, indicated generally at $i$, but formed, in the preferred embodiment, of two separate disks $i'$, $i^2$, each keyed to the shaft $h'$ and connected by lateral pins $i^3$ of a number determined by the number of indexing operations desired, this number, in turn, being dependent upon the number of cuts desired. On a standard $f^4$ carried with the table $b$ is pivoted an indexing pawl $k$, which preferably extends directly over the pins $i^3$ and has a beveled tooth $k'$ adapted to rest between two proximate pins and thereby hold the wheel $i$ in indexing position. The pawl $k$ is operatively engaged by a spring $k^2$ to hold it yieldingly in indexed position. On a standard $a'$ carried by the bed $a$ of the machine is pivoted an actuating pawl $l$ which preferably extends under the pins $i^3$ but has its nose $l'$ normally resting between two proximate pins. This pawl is held in operative relation to the pins by means of the spring $l^3$ anchored to the standard $a'$.

From the description given the operation of the fixture should be clear. When the machine is at rest the operator opens the chuck by manipulation of the cam lever $d'$, inserts a nut $e$ and clamps it in the chuck by further manipulation of the lever $d'$ by which the jaws of the chuck are compressed on the nut. When power is applied to the machine the cutter $c$ is actuated and the table $b$ is reciprocated to the right as viewed in the drawing so as to move the nut against the cutter for the purpose of effecting the castellation. When a slot of desired depth is completed the table $b$ is reciprocated toward the left as viewed in the drawing. At this time, the nose $l'$ of the pawl $l$ will be found in engagement with one of the pins $i^3$, so that movement of the table with relation to the pawl will cause rotation of the indexing wheel $i$ in a counterclockwise direction to a point where the indexing tooth $k'$ is carried over the next pin $i^3$ and is drawn between that pin and the next proximate pin. Rotation of the indexing wheel $i$ in this manner through one-sixth of a revolution will be communicated through the one to one gears $h$, $g$ to the chuck $d$ and nut $e$. The chuck $d$ is rotatable with its sleeve $f$ and the nut is thereby rotated one-sixth of a revoluton and indexed for the next succeeding castellation. Successive reciprocations of the table $b$ will effect successive indexing movements in the manner described. Upon completion of the predetermined number of cuts the object will be removed from the chuck and a new object placed therein. From the description given it will be evident that the number of indexing movements and their angular displacement will depend entirely upon the number of pins $i^3$ in the indexing wheel $i$ and their angular displacement. For instance, an indexing wheel having only four pins might be employed for the castellating of a square nut, and an indexing wheel having the pins displaced angularly at unequal distances might be slipped on the shaft $h'$ in place of the one illustrated. Further, it will be apparent that cuts on objects other than nuts might be readily made and any desired type of machine, cutting tool and table might be employed.

I claim as my invention:

1. In combination with a reciprocating table and a fixed cutter, a fixture mounted on the table including a chuck for the work, an indexing wheel separate from the chuck and a pawl coöperating with the wheel and operated by movement of the table for indexing the work.

2. In combination with a machine bed, reciprocating table mounted thereon and fixed cutter, a fixture carried on the table and comprising a rotatable chuck for the work, an indexing wheel, gear connections between the wheel and the chuck, and a pawl mounted on the bed and coöperating with the indexing wheel upon reciprocations of the table to index the work.

3. In combination with a machine bed, a reciprocating table thereon and a fixed cutter, a fixture mounted on the table comprising a rotatable chuck for the work, a gear connected with the chuck, an indexing wheel, a gear carried with the indexing wheel in mesh with the first named wheel, and a pawl mounted on the bed and coöperating with the indexing wheel upon reciprocations of the table to rotate the chuck.

4. In combination with a machine bed, a reciprocating table thereon and a fixed cutter, a fixture mounted on the table comprising a rotatable chuck for the work, a gear connected with the chuck, an indexing wheel, a gear carried with the indexing wheel in mesh with the first named wheel, a pawl mounted on the bed and coöperating with the indexing wheel upon reciprocations of the table to rotate the chuck, and an independent pawl coöperating with the indexing wheel to hold the work in indexed position.

5. In combination with a reciprocating machine table and a fixed cutter, a fixture mounted on the table comprising a rotatable chuck for the work and an indexing wheel connected operatively with the chuck and comprising spaced disks and pins connecting said disks, and a pawl coöperating successively with the pins to rotate the wheel upon reciprocation of the table.

6. In combination with a machine bed, a table mounted reciprocably thereon, a fixed cutter, a chuck for the work rotatably mounted on the table, a gear carried with the chuck, a second gear meshing with the first gear, a stub shaft for the second gear journaled on the table, an indexing wheel keyed on the stub shaft and including spaced disks connected by a plurality of pins, a pawl pivoted on the bed and engaging the pins successively upon reciprocation of the table to index the wheel, and an indexing pawl carried with the table and engaging the pins successively to hold the wheel in indexed position.

This specification signed this 29 day of October A. D. 1920.

JOSEPH A. PELIZZONI.